(12) United States Patent
Wimmer et al.

(10) Patent No.: US 9,891,369 B2
(45) Date of Patent: Feb. 13, 2018

(54) EQUIPMENT PART HAVING LUMINOUS VISIBLE SIDE

(71) Applicant: Lisa Draexlmaier GmbH, Vilsbiburg (DE)

(72) Inventors: Markus Wimmer, Mamming (DE); Manfred Winklbauer, Landshut (DE); Elena Justus-Bischler, Vilsbiburg (DE); Josef Lang, Kumhausen (DE); Bernhard Bayersdorfer, Baierbach (DE); Josef Lurz, Velden (DE)

(73) Assignee: Lisa Draexlmaier, Vilsbiburg (DE)

( * ) Notice: Subject to any disclaimer, the term of this patent is extended or adjusted under 35 U.S.C. 154(b) by 236 days.

(21) Appl. No.: 14/838,476

(22) Filed: Aug. 28, 2015

(65) Prior Publication Data

US 2016/0062022 A1    Mar. 3, 2016

(30) Foreign Application Priority Data

Aug. 29, 2014  (DE) ......................... 10 2014 112 470

(51) Int. Cl.
*F21V 7/04*     (2006.01)
*F21V 8/00*     (2006.01)

(52) U.S. Cl.
CPC ........... *G02B 6/005* (2013.01); *G02B 6/0065* (2013.01); *G02B 6/0073* (2013.01)

(58) Field of Classification Search
CPC .... F21S 48/2268; F21S 48/238; G02B 6/005; G02B 6/0065; G02B 6/0073; B60Q 3/62
USPC ................................................ 362/606, 511
See application file for complete search history.

(56) References Cited

U.S. PATENT DOCUMENTS

| | | | | |
|---|---|---|---|---|
| 6,480,307 | B1* | 11/2002 | Yang | .................... G02B 5/0215 349/65 |
| 7,748,148 | B2* | 7/2010 | Reiland | .................. G02B 6/005 362/311.01 |
| 2001/0053071 | A1* | 12/2001 | Yoda | ....................... G09F 13/04 362/23.07 |

(Continued)

FOREIGN PATENT DOCUMENTS

| | | |
|---|---|---|
| DE | 10333040 A1 | 2/2005 |
| DE | 102004060810 A1 | 6/2006 |
| DE | 102008017345 A1 | 11/2008 |

(Continued)

*Primary Examiner* — Anh Mai
*Assistant Examiner* — Matthew Peerce
(74) *Attorney, Agent, or Firm* — Finnegan, Henderson, Farabow, Garrett & Dunner LLP (57) ABSTRACT

An equipment part may comprise a carrier, a composite film, and a light source. The composite film may be disposed on the carrier and may form a visible side of the equipment part. The composite film may comprise a light-conducting layer into which the light rays emitted by the light source are coupled. A scatter layer may be disposed on a side of the light-conducting layer facing the carrier, with the light rays coupled into the light-conducting layer emitting through said scatter layer. The composite film may comprise a first and a second paint layer, where the first paint layer may be disposed on a side of the scatter layer facing the carrier, and the second paint layer may be disposed on a side of the light-conducting layer facing away from the carrier. The equipment part may be produced via a method for production of such an equipment part.

20 Claims, 3 Drawing Sheets

(56) References Cited

U.S. PATENT DOCUMENTS

2012/0170307 A1* 7/2012 Eberwein ................ B60Q 1/26
            362/602

FOREIGN PATENT DOCUMENTS

| DE | 102009030684 A1 | 12/2010 |
| DE | 102010030660 A1 | 12/2011 |
| DE | 102010036795 A1 | 2/2012 |
| DE | 102013100941 A1 | 7/2014 |
| DE | 102013021600 A1 | 8/2014 |

* cited by examiner

EQUIPMENT PART HAVING LUMINOUS VISIBLE SIDE

CROSS-REFERENCE TO RELATED APPLICATION

This application is based upon and claims the benefit of prior German Application No. 10 2014 112 470.7, filed on Aug. 29, 2014, the entire contents of which are incorporated herein by reference.

TECHNICAL FIELD

The present disclosure relates to an equipment part that may comprise a carrier, a composite film, and a light source, wherein the composite film forms the visible side of the equipment part and can be illuminated by way of the light source. The present disclosure further relates to the production of such an equipment part.

BACKGROUND OF THE DISCLOSURE

In addition to functionality, in the present day and age, the outer and inner appearance of the motor vehicle plays an increasingly more important role. In addition to upscale decors, equipment parts are increasingly provided with light guides and light sources that illuminate the equipment part. Injection-molded planar light guides, for example, are frequently used on equipment parts. Light is coupled into the light guide outside a visible area and is coupled out across the entire surface area of the light guide in the visible range.

To achieve homogeneous outcoupling of the light across the entire surface area of the light guide, the surface of the light guide is usually roughened. The rough surface introduces irregularities into the light guide, which scatter the incoupled light and therefore favor light outcoupling. The roughened surface is usually generated by mechanical processing, such as grinding or embossing. Such methods, however, may have the disadvantage that the light guide must be sufficiently thick because otherwise there is the risk that the light guide becomes damaged, or even destroyed, due to insufficient inherent rigidity. This can drastically limit the use of light guides on equipment parts, because the equipment parts must always be adapted to the wall thicknesses of the light guides.

Moreover, the light guide may be required to be adapted to the shape of the equipment part. Using the light guide on other equipment parts may only be possible in certain cases. This can have an adverse effect on the production costs, in particular in the case of injection-molded light guides, because a separate mold may need to be kept available for each light guide shape.

While it is also possible to dispose light guides beneath the visible side of an equipment part, which creates degrees of freedom with respect to the shape of the light guide, this arrangement may also have drawbacks. For example, the layer forming the visible side may be weakened or thinned in the region of the light guide, so that the light guide is able to trans-illuminate it. Equipment parts, however, frequently include attachment elements outside the visible range, via which the equipment part can be attached to the vehicle. However, these attachment parts may limit the arrangement options of the light guide. In addition, sufficient installation space may be required to be able to integrate the light guide.

SUMMARY

Embodiments of the present disclosure provide an equipment part comprising a light guide which, in terms of the geometry thereof, is not influenced or is only minimally influenced by the light guide. The present disclosure includes embodiments related to an equipment part and a method for producing an equipment part.

In one embodiment, an equipment part for a motor vehicle may comprise a carrier, a composite film, and a light source. The composite film may be disposed on the carrier and may form the visible side of the equipment part. The composite film may comprise a light-conducting layer into which the light rays can be coupled. The light rays may be generated and emitted by the light source. For this purpose, the light source can be disposed on an end face of the light-conducting layer, for example. The light-conducting layer is may be made of a transparent material. The light-conducting layer is may be made of a thermoplastic film, for example. The plastic film can be made in particular of polycarbonate (PC) or polymethyl methacrylate (PMMA).

The composite film moreover may include a scatter layer on a side of the light-conducting layer facing the carrier. The light rays coupled into the light-conducting layer may emit through the scatter layer, and the scatter layer may therefore be transparent or semi-transparent. The scatter layer moreover may comprise light-scattering elements, which may influence the propagation direction of the light rays. The composite film additionally may comprise a first paint layer, which may be provided on the side of the scatter layer facing the carrier. The first paint layer may be used to increase total reflections of the light rays at the interface between the scatter layer and the first paint layer and may have a defined refractive index. The first paint layer can be transparent or translucent, so that the carrier may remain visible through the first paint layer.

If light rays are coupled into the light-conducting layer with the aid of the light source, the light rays may also emit through the scatter layer. The light rays may be reflected back into the scatter layer or into the light-conducting layer at the interface between the scatter layer and the first paint layer. The light rays may be scattered, so that the reflected light rays are outcoupled on the side of the composite film facing away from the carrier.

So as to provide that the light outcoupling is created primarily via the reflections and refractions in the scatter layer or at the interface between the scatter layer and the first paint layer, the composite film may have a second paint layer on the side of the light-conducting layer facing away from the carrier. The second paint layer may be used to increase the total reflections at the interface to the light-conducting layer and therefore likewise may have a defined refractive index. The second paint layer may be transparent so that the outcoupled light rays are not influenced by the paint layer.

A defined refractive index in the present context can be understood to mean that the refractive index of the first and second paint layers is deliberately set to a certain value. The refractive indices of the first and second paint layers do not necessarily have to be constant across the entire surface area of the composite film for this purpose. Rather, by deliberately setting the refractive indices of the first and second paint layers, it is possible to deliberately control the reflection and refraction behavior of the light rays. The defined refractive indices of the first and second paint layers may be lower than the refractive index of the scatter layer and of the light-conducting layer.

The composition according to the present disclosure makes it possible to design the composite film, and in particular the light-conducting layer, considerably thinner than comparable light guides. This is primarily because, as a result of the separate scatter layer, the light-conducting layer may not be exposed to high mechanical stresses, which could damage the light-conducting layer. The low layer thickness and associated dimensional instability of the composite film may further simplify the arrangement on the carrier. The carrier may not need to be adapted to the composite film because the film can be laminated onto the carrier, similarly to a conventional decorative layer. In at least one embodiment, only a cut-out may be provided in the carrier for arranging the light source.

In an embodiment of the present disclosure, the scatter layer may have a plurality of depressions on the side facing away from the light-conducting layer. The depressions can be designed as notches or openings, for example, and serve as light-scattering elements. The depressions may create a surface structure that allows the reflected light to be scattered more strongly. To ensure that the outcoupling of the light rays on the visible side is homogenous across the entire surface area of the composite film, the type and number of depressions may change across the surface area of the scatter layer.

In a further embodiment of the present disclosure, the scatter layer may comprise a plurality of inclusions or scattering particles. As a result of the inclusions or scattering particles, a desired scattering effect may be achieved without processing the surface of the scatter layer. The inclusions can be implemented by deliberately introducing air pockets, for example, wherein the scattering particles can be implemented by introducing reflective or refractive materials.

In a further embodiment of the present disclosure, it is possible for the scatter layer to comprise a combination of depressions, scattering particles and inclusions.

In a further embodiment of the present disclosure, the scatter layer may have a refractive index that approximately or substantially corresponds to the refractive index of the light-conducting layer. Therefore, the light present in the light-conducting layer may radiate into the scatter layer and may not be reflected at the interface to the scatter layer. The scatter layer therefore may be made of the same material as the light-conducting layer.

In a further embodiment of the present disclosure, the second paint layer may be imprinted on the side facing away from the light-conducting layer. Because the composite film forms the visible side of the equipment part, the composite film also may have a decorative function, in addition to the illuminating function. Imprinting, for example three-dimensional printing or relief printing, can therefore be used to generate a visually aesthetically appealing pattern, which is may be also visible in the non-illuminated state. Additionally, a tactile surface structure of the composite film can therefore be implemented.

In a further embodiment of the present disclosure, a decorative layer may be disposed on the side of the second paint layer facing away from the light-conducting layer. The composite film may comprise a decorative layer disposed on a side facing away from the carrier. The decorative layer can be disposed either across the entire composite film, or only in certain regions of the composite film. The decorative layer may be joined to the paint layer with the aid of an adhesive. The decorative layer may be made of a transparent or translucent material, so that the outcoupled light can transilluminate the decorative layer. In addition, the decorative layer can contain color pigments or other inclusions and may be made of a film.

On a side facing and/or facing away from the second paint layer, the decorative layer can have an imprint. The imprint may be a pattern, for example. For example, when an imprint is provided on both the side facing the second paint layer and on the side facing away from the same, it is possible to achieve visually three-dimensionally appearing effects, in particular when the light rays transilluminate the decorative layer.

In a further embodiment of the present disclosure, the carrier may be made of a transparent material and may be disposed at least partially between the light source and the composite film. Because the carrier may be made of a transparent material, no cut-out is required be provided to dispose the light source directly on the light-conducting layer. It is also possible for the light source to couple the light rays through the carrier into the composite film. The carrier may be made of PMMA or PC.

In a further embodiment of the present disclosure, the light-conducting layer may comprise an opening via which the light rays of the light source may be coupled in. The opening can be introduced into the light-conducting layer by removing material, for example. Particularly, for example, the second paint layer may be completely removed in the region of the opening. As a result of the opening, the light source may not necessarily have to be disposed in an end region of the composite film. It is therefore also possible to dispose the light source on the composite film in a region that is not visible to the observer.

In a further embodiment of the present disclosure, the first and second paint layers may have refractive indices that are lower than the refractive index of the light-conducting layer. A lower refractive index may favor reflections of the light rays propagating within the light-conducting layers on the adjoining paint layers. The refractive index may be lower in the regions having a smaller distance from the light source than in the regions having a larger distance from the light source.

In a further embodiment of the present disclosure, the composite film may have an overall thickness of 0.6 to 3 millimeters (mm). The composite film may be sufficiently thick in this range to transport enough light, while still being dimensionally unstable enough to be applied to the contour of a carrier in a controlled manner.

A method according to the present disclosure for producing an equipment part according to the present disclosure may comprise the following steps: applying a scatter layer to one side of a light-conducting layer; applying a first paint layer to a side of the scatter layer facing away from the light-conducting layer; applying a second paint layer to a side of the light-conducting layer facing away from the scatter layer, so that a composite film is created; inserting the composite film into a cavity of a mold that has the contour of the equipment part, wherein the composite film is disposed on a wall of the cavity which forms what is later the visible area of the equipment part; and forming the carrier by introducing liquid plastic material into the cavity of the mold, wherein the side of the composite film facing the wall does not make contact with the liquid plastic material.

Because the composite film may be joined to the carrier by back-molding the carrier onto the film, additional adhesive layer is not required between the carrier and the composite film. This may save an additional process step and may ensure a reliable joint between the carrier and the composite film. After the liquid plastic material has cured, the finished equipment part can be removed from the mold. To prevent the composite film from being damaged by the high temperatures during contact with the liquid plastic material, at least the light-conducting layer may be made of a material that has a higher melting point than the material that forms the carrier.

In an embodiment of the method according to the present disclosure, a protective coating may be applied to the composite film before the same is inserted into the cavity, the coating protecting the composite film from an action of the temperature of the liquid plastic material. Especially in regions in which the carrier has a high thickness, the composite film can be exposed to a high temperature over an extended period. With the help of the protective coating, it is possible to prevent damage to the composite film from excessively long action of the temperature. The protective coating can be applied by spraying or by lamination onto the composite film, for example.

In a further embodiment of the method according to the present disclosure, an opening is introduced into the light-conducting layer of the composite film by way of material removal. The opening can be introduced either before or after the composite film is inserted into the cavity of the mold. However, the material removal for forming the opening may be carried out prior to the insertion into the cavity. The opening can be introduced into the light-conducting layer with the aid of a milling cutter, a drill or a knife, for example. The second paint layer in the region of the opening may also be removed during the removal of the light-conducting layer.

In a further embodiment of the method according to the present disclosure, a decorative layer may be applied to the second paint layer prior to the insertion into the cavity. By applying the decorative to the composite film already prior to the insertion into the cavity, the contour of the decorative layer may conform precisely to the shape of what will later be the carrier part. In addition, the method may be further simplified because the application of a decorative layer onto a planar composite film may be easier to implement than onto a contoured composite film.

In a further embodiment of the method according to the present disclosure, the scatter layer may be applied to the light-conducting layer using a printing method. A printing method in this context may be understood to mean additive or generative printing methods, as they are used in 3D printing, for example. It has been shown that such a printing method may be suited to form the scatter layer because in this way particularly fine and detailed light-scattering elements can be introduced into the scatter layer. For example, using a printing method, it is possible to generate the scatter layer by way of a plurality of pigments or deliberately introduced geometries.

In a further embodiment of the method according to the invention, the composite film may be thermoformed prior to insertion into the cavity. The composite film may be thermoformed prior to insertion into the cavity, for example, when the cavity has a complex geometry, to prevent the composite film from becoming damaged or even tearing as a result of the high pressures that can develop when the hot plastic material flows in.

The present disclosure describes embodiments of a method and a device. Unless indicated otherwise, the comments made regarding the method can be applied analogously to the device. The same applies conversely so that the embodiments of the device also are also reflected in the method.

Further advantages and features of the present invention will moreover be apparent from the following description of embodiments. The features described in the present disclosure can be implemented alone or in combination. The following description of the embodiments is made with reference to the accompanying drawings.

BRIEF DESCRIPTION OF THE FIGURES

Further details and advantages of embodiments will be described hereafter with reference to the figures. In the drawings.

Unless indicated otherwise, identical and like acting elements are denoted by the same reference numerals in the following description.

DETAILED DESCRIPTION

Figure 1:
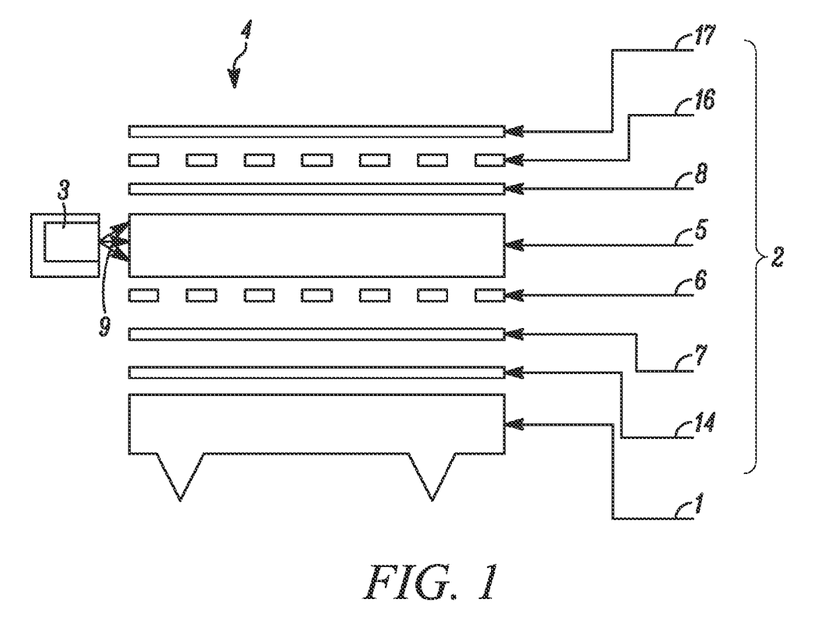
FIG. 1 shows a schematic composition of an equipment part according to the present disclosure.

FIG. 1 shows a schematic layer composition of an equipment part according to the present disclosure. The equipment part may comprise a carrier 1, on which a composite film 2 is disposed. The composite film 2 may form a visible side 4 of the equipment part. In this way, the composite film 2 faces an observer of the equipment part. The equipment part moreover may comprise a light source 3, which may couple light rays 9 into the composite film 2. The light source 3 may be a monochromatic light-emitting diode. Multi-colored light-emitting diodes or organic light-emitting diodes, may also be used. The composite film 2 may include a light-conducting layer 5 made of polycarbonate, into which the light rays 9 of the light source 3 may be coupled. The light-conducting layer 5 may have a homogeneous thickness of 0.8 mm.

A scatter layer 6 may be disposed on the side of the light-conducting layer 5 facing the carrier 1. In the present embodiment, the scatter layer 6 may be likewise made of polycarbonate and may have been printed onto the light-conducting layer 5 in the course of a printing process. The scatter layer 6 may have a structured surface on the side facing away from the light-conducting layer 5, wherein the structure may be formed by a plurality of pyramids disposed next to each other. Because the scatter layer 6 may be made of the same material as the light-conducting layer 5, the incoupled light rays 9 may emit through both the light-conducting layer 5 and the scatter layer 6.

The composite film 2 moreover may comprise a first paint layer 7 on the side facing the carrier 1. The first paint layer 7 may be applied to the scatter layer 6 by a spraying method and may have a refractive index that is lower than the refractive index of the scatter layer 6 and of the light-conducting layer 5. A second paint layer 8 may be sprayed onto the side of the light-conducting layer 5 facing away from the carrier 1. In this way, the light-conducing layers may be enclosed by the two paint layers 7 and 8. The light rays 9 emitted by the light source 3 may be coupled into the light-conducting layer 5 via an end face of the same. In this way, the light rays 9 may extend approximately parallel to the visible side inside the light-conducting layer 5. The second paint layer 8 may prevent the light rays 9 from coupling out already at very flat angles of incidence in the direction of the visible side 4 of the equipment part. Rather, a majority of the light rays 9 may be reflected back into the light-conducting layer 5 by the second paint layer 8, and the rays may emit in the direction of the second paint layer 2 directly after incoupling.

Similarly to the transition from the second paint layer 8 to the light-conducting layer 5, the light rays 9 may also be reflected at the phase interface from the scatter layer 6 to the first paint layer 7. However, due to the irregular surface of the scatter layer 6, the reflected light rays 9 may be scattered strongly. As a result, some of the reflected light rays 9 may impinge on the second paint layer 8 at an angle that is smaller than the critical angle necessary for total reflection, so that the light rays 9 may penetrate the second paint layer 8.

On a side of the second paint layer 8 facing away from the light-conducting layer 5, the composite film 2 may have an imprint 16, which may have been applied to the paint layer 8 in the course of an ink jet process. The imprint 16 may create an aesthetic pattern, which can be noticeable to the observer when the equipment part is illuminated and not illuminated. This, in turn, can be covered by a protective paint 17. The protective paint 17 may protect the composite film 2 from environmental influences and mechanical damage.

The shown equipment part can be produced in a back-molding process, which is not shown. To this end, the composite film 2 may be first thermoformed in keeping with the shape of the visible side 4 of the equipment part and subsequently inserted into a mold. Thereafter, the mold may be filled with liquid polypropylene to create the carrier 1. To prevent the composite film 2 from being damaged by the high temperatures of the liquid polypropylene, the composite film 2 can be covered with an additional protective coating 14 before the plastic material is introduced. The protective coating 14 can additionally include a white color. The paint layers 7 and 8 may be made of a transparent material. Despite the first paint layer 7, light rays 9 may penetrate the first paint layer 7 in the direction of the carrier 1 and may undesirably outcouple in the direction of the carrier 1. However, due to additional white coloration of the protective coating 14 that may be included, an additional reflecting layer can be created. Light rays 9 passing through the first paint layer 7 may therefore be reflected back into the composite film 2.

Figure 2:
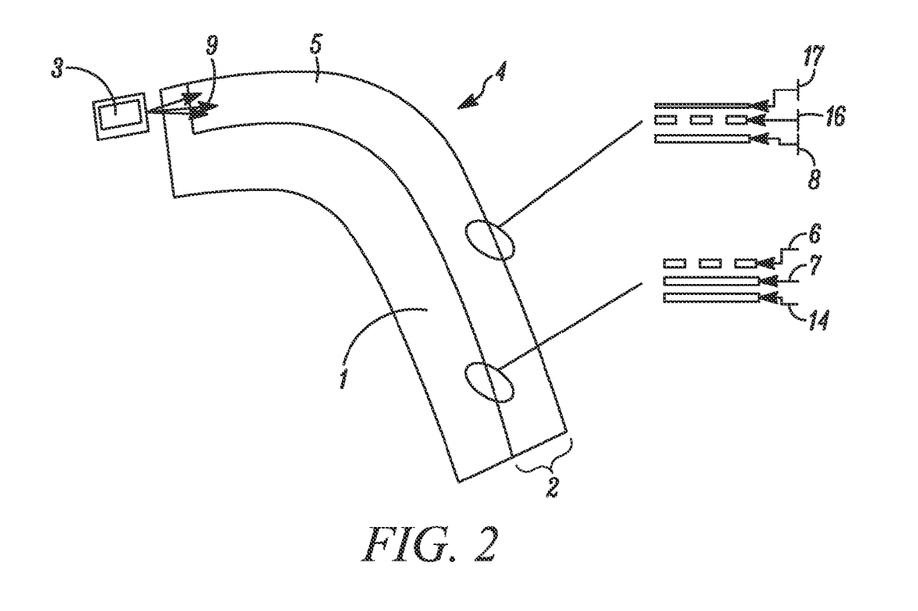
FIG. 2 shows a sectional view of a first embodiment of an equipment part according to the present disclosure.

FIG. 2 shows a sectional view of a first embodiment of an equipment part according to the present disclosure. The equipment part can include a transparent carrier 1 which may be made of polycarbonate, on which the composite film 2 can be disposed. The contour of the equipment part may be predefined by the carrier 1. The composite film 2 can have an overall thickness of 1.9 mm and may conform to the curves of the contour of the carrier 1. The light-conducting properties or the outcoupling behavior of the incoupled light rays 9 may not be impaired here. In the shown embodiment, the homogeneous outcoupling behavior may be additionally supported by a scatter layer 6, where the scatter layer 6 may have a surface structure that differs in various regions of the composite film. For example, the scatter layer 6 can have a considerably less pronounced surface structure in the curvature of the equipment part than in the planar regions.

Like the carrier 1, the light-conducting layer 5 of the composite film 2 may be made of transparent polycarbonate. The carrier 1 can be disposed between the composite film 2 and the light source 3. However, because the carrier 1 can be transparent, the light source 3 may emit through the carrier 1 into the light-conducting layer 5. Thus, the carrier 1 may need not be processed for arranging a light source 3. Rather, in this embodiment, the light source 3 can be placed onto the carrier 1. On a side facing the carrier 1, the composite film 2 may comprise a protective coating 14, which can contain a white color, so that the transparent carrier 1 is not visible to the observer. Seen from the visible side 4, the equipment part comprising the transparent carrier 1 may therefore not be distinguished from an equipment part comprising a non-transparent carrier 1.

Figure 3:
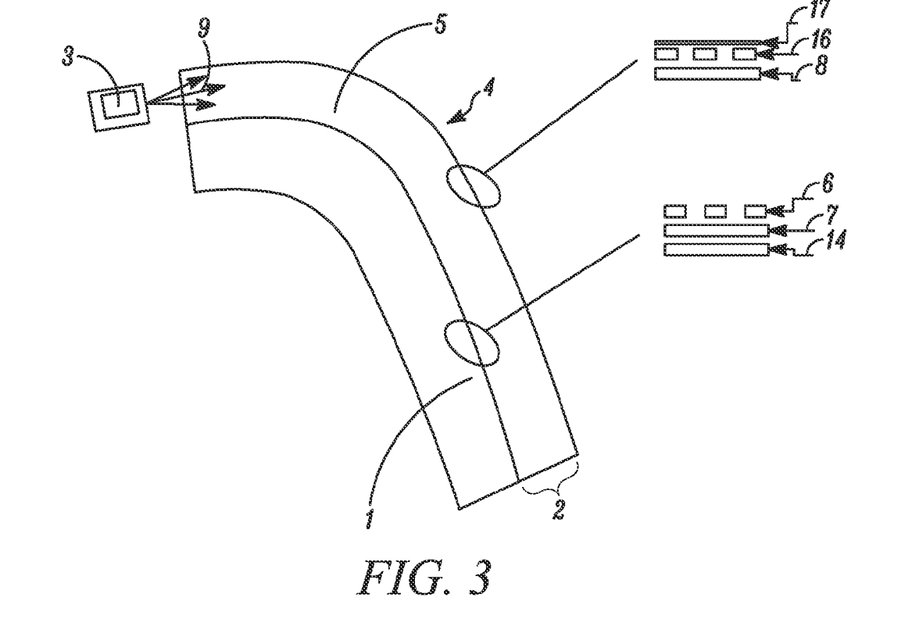
FIG. 3 shows a sectional view of a second embodiment of an equipment part according to the present disclosure.

FIG. 3 shows a sectional view of a second embodiment of the equipment part according to the present disclosure. The carrier 1 can be made of non-transparent polypropylene. In addition to polycarbonate and polypropylene, it is also possible to use other plastic materials, such as polyethylene, polymethyl methacrylate or acrylonitrile butadiene styrene, for example, for forming the carrier. In this embodiment, the light rays 9 of the light source 3 may be no longer able to penetrate the carrier 1, so the carrier 1 can be removed in an end-face region of the composite film 2 using a milling cutter. However, the material removal can also be carried out by way of drilling, cutting, or other comparable material-removing processes. The composite film 2 may comprise a white protective coating 14. Plastic material that has a sufficiently low melting temperature may be used, and the protective coating 14 may thereby be dispensed with. If the carrier 1 is additionally dyed in a white color or in another easily reflective color, this added effect of the protective coating 14 may be substituted by the carrier 1.

The shown equipment part can be used as a trim part in a motor vehicle, for example. Due to the dimensional instability and the good light conductivity of the composite film 2, functional equipment parts can also be implemented. For example, instrument panels, door moldings, or center consoles can be designed as the equipment part according to the invention.

Figure 4:
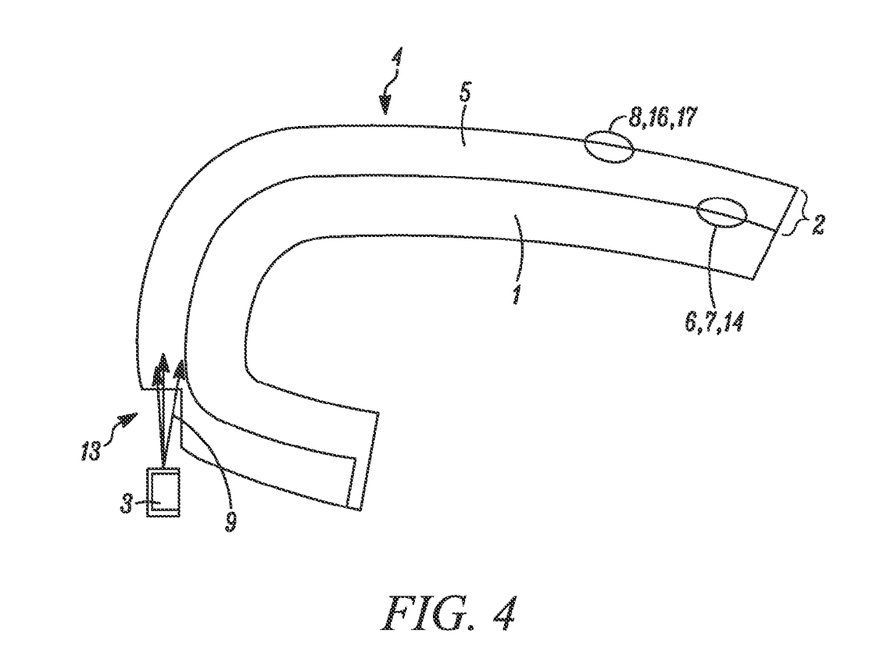
FIG. 4 shows a sectional view of a third embodiment of an equipment part according to the present disclosure.

FIG. 4 shows a third embodiment of an equipment part according to the present disclosure. The equipment part may have an edge folding, so that an undercut region can be created, which may not be visible to the observer of the equipment part. Such a design may be necessary, for example, if additional equipment parts directly adjoin the equipment part. It can therefore be avoided that potential gaps or even omissions between the equipment parts are visible. Moreover, such an edge folding may be provided for attaching the equipment part. An opening 13 can be introduced into the composite film 2, which may serve an incoupling point for the light source 3. For this purpose, the second paint layer 8, the imprint 16, and the protective layer 17 can be completely removed in the undercut region. Moreover, a step, which may form the opening 13, can be introduced into the light-conducting layer 5 with the aid of a milling process, for example. The light source 3 may moreover be provided directly in front of the opening 13, so that light rays 9 can impinge perpendicularly onto the opening 13 and couple into the light-conducting layer 5. The degree of losses from reflections at the incoupling point can therefore accordingly be low.

It is also possible to provide a sharp edge instead of the opening 13 in the edge folding region of the carrier 1 in one embodiment, which is not shown. The sharp edge can be covered by the composite film 2, so that the composite film 2 likewise forms a sharp edge on which a light source 3 for incoupling the light rays 9 can be disposed. In this embodiment, the second paint layer 8, the imprint 16, and the protective paint 17 may be removed so as not to impair the incoupling of the light rays 9.

Figure 5:
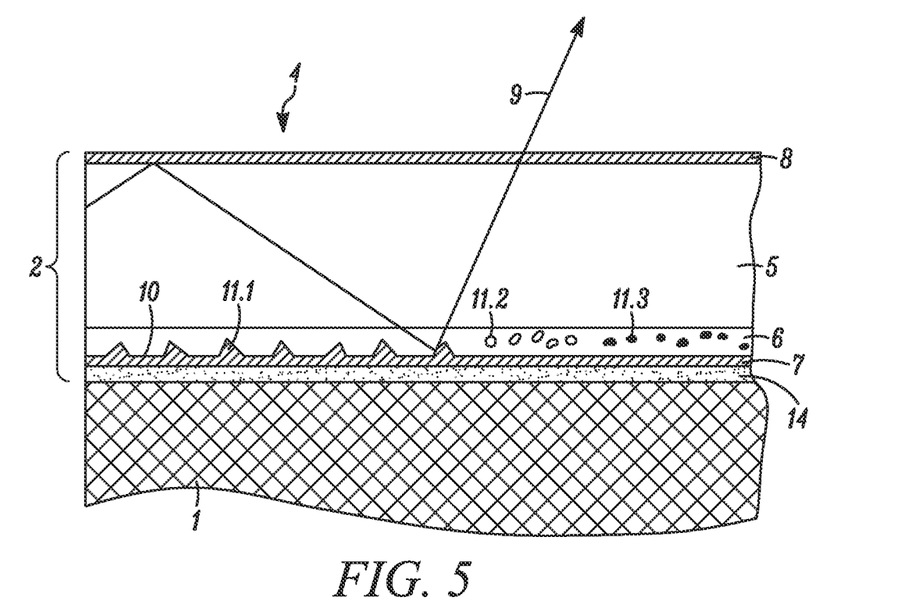
FIG. 5 shows an enlarged illustration of a layer composition of one embodiment of a composite film.

FIG. 5 shows a sectional view of an enlarged section of the equipment part in the region of the composite film 2. The composite film 2 may comprise the light-conducting layer 5, the scatter layer 6, the first paint layer 7, and the second paint layer 8. Moreover, the protective coating 14 can be disposed between or at a border of the carrier 1 and the composite film 2. To provide the desired light scattering, the scatter layer 6 may have depressions 11.1 in a first region, so that irregularities are formed on the side facing the first paint layer 7. Due to these irregularities, it is possible for incident light rays 9 to be scattered and reflected at the phase interface 10 between the scatter layer 6 and the first paint layer 7.

Inclusions 11.2 can be introduced into a further region of the scatter layer. These inclusions 11.2 can be air inclusions or inclusions of another medium, for example. The inclusions 11.2 may influence the refractive behavior at the phase transition between the inclusion 11.2 and the scatter layer 6, and it is also possible for the light rays 9 to penetrate the inclusion 11.2 and change the propagation direction thereof in the process.

Scattering particles 11.3 in the form of pigments may be introduced into the scatter layer 6 in a third region. These pigments can have a reflective surface, so that light is accordingly reflected upon impingement on the pigments.

Figure 6:
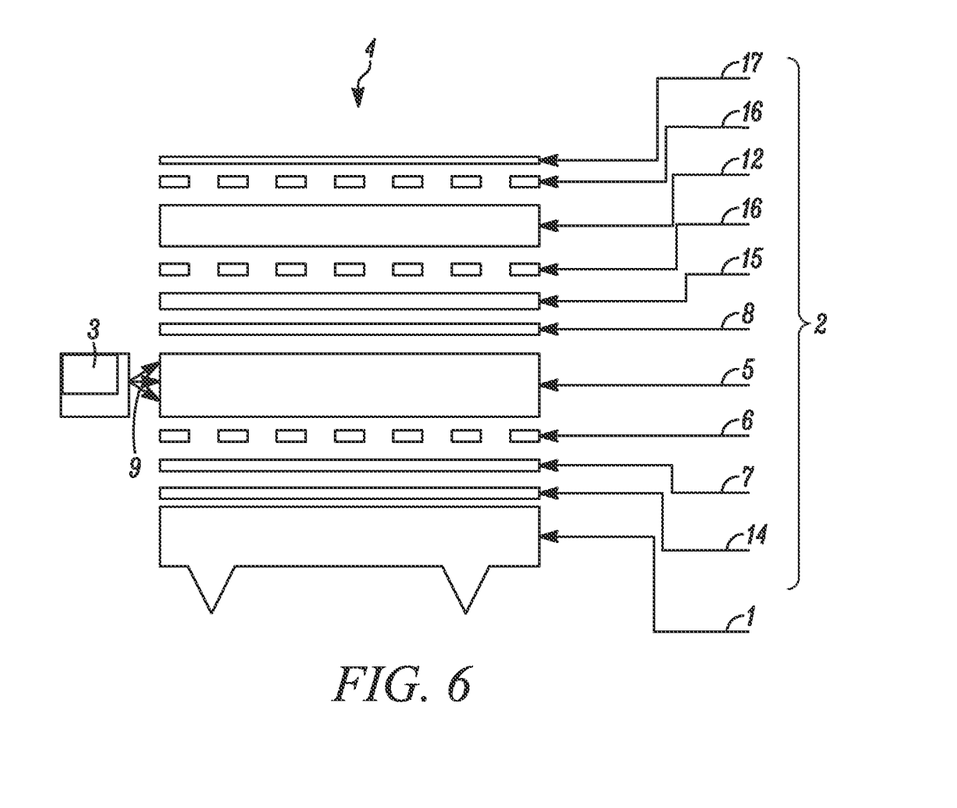
FIG. 6 shows an alternative embodiment of a layer composition of the equipment part according to the present disclosure.

FIG. 6 shows a sectional view of an alternative layer composition of an equipment part according to the present disclosure. The composite film 2 may additionally comprise a decorative layer 12. The decorative layer 12 may be glued onto the second paint layer 8 with the aid of an adhesive 15. Moreover, the decorative layer 12 may be made of transparent polycarbonate. The decorative layer 12 may comprise an imprint 16 both on the side facing and on the side facing away from the second paint layer 8. This kind of arrangement of the imprints 16 can create a depth effect, which the observer may perceive as a three-dimensionally appearing visual effect. The decorative layer 12 may have a thickness of 0.5 mm and may therefore be thinner than the light-conducting layer 5, which may have a thickness of 0.7 mm. The dimensional instability and the processing properties of the composite film 2 may therefore be preserved, despite the additional decorative layer 12.

The explanations provided with reference to the figures are purely illustrative and shall not be understood to have any limiting effect. It is possible to make various modifications to the described embodiments without departing from the scope of protection as it is defined in the accompanying claims.

The invention claimed is:

1. A luminous equipment part comprising:
a carrier comprising a transparent material;
a composite film; and
a light source,
wherein the composite film is disposed on the carrier and forms a visible side of the equipment part,
wherein the composite film comprises a light-conducting layer having an end face, a first side facing the carrier, and a second side facing away from the carrier, the end face being coupled to the light source, wherein the light source emits light rays into the light-conducting layer via the end face,
wherein the carrier is at least partially disposed between the light source and the light-conducting layer,
wherein a scatter layer is disposed on the first side of the light-conducting layer facing the carrier, with the light rays coupled into the light-conducting layer emitting through the scatter layer,
wherein the composite film comprises a first and a second paint layer, the first paint layer being disposed on a side of the scatter layer facing the carrier, and the second paint layer being disposed on the second side of the light-conducting layer facing away from the carrier.

2. The equipment part according to claim 1, wherein the scatter layer comprises a plurality of depressions on a side facing away from the light-conducting layer.

3. The equipment part according to claim 1, wherein the scatter layer comprises a plurality of inclusions or scattering particles.

4. The equipment part according to claim 1, wherein the scatter layer has a refractive index that substantially corresponds to the refractive index of the light-conducting layer.

5. The equipment part according to claim 1, wherein the second paint layer comprises a side facing away from the light-conducting layer, the side comprising an imprint.

6. The equipment part according to claim 1, wherein the composite film comprises a decorative layer on a side facing away from the carrier.

7. The equipment part according to claim 6, wherein the decorative layer is a transparent material comprising an imprint with a pattern.

8. The equipment part according to claim 1, wherein the light-conducting layer comprises an opening coupling the light rays into the light-conducting layer.

9. The equipment part according to claim 1, wherein the first and the second paint layer each have refractive indices that are lower than the refractive index of the light-conducting layer.

10. The equipment part according to claim 1, wherein the composite film has an overall thickness of 0.6 to 3 millimeters (mm).

11. The equipment part according to claim 1, wherein the first and second paint layers are at least partially transparent.

12. A luminous equipment part for a motor vehicle, the equipment part comprising:
a light source configured to emit light rays;
a carrier comprising a transparent material; and
a composite film disposed on the carrier and forming a visible side of the equipment part, the composite film comprising:
a light-conducting layer having an end face, a first side facing the carrier, and a second side facing away from the carrier, the end face being coupled to the light source;
a scatter layer disposed on the first side of the light-conducting layer;
a first paint layer disposed on a side of the scatter layer facing the carrier; and
a second paint layer disposed on the second side of the light-conducting layer;
wherein:
at least a portion of the carrier is disposed between the light source and the light-conducting layer;
the light source emits light rays into the light-conducting layer via the end face; and
the light rays coupled into the light-conducting layer emit through the scatter layer.

13. The equipment part according to claim 12, wherein the composite film further comprises:
an imprint disposed on a side of the second paint layer facing away from the carrier; and a third paint layer being disposed on a side of the imprint facing away from the carrier.

14. The equipment part according to claim 12, wherein the scatter layer comprises a plurality of depressions on a side facing away from the light-conducting layer.

15. The equipment part according to claim 12, wherein the scatter layer comprises a plurality of inclusions or scattering particles.

16. The equipment part according to claim 12, wherein the scatter layer has a refractive index that substantially corresponds to the refractive index of the light-conducting layer.

17. The equipment part according to claim 12, wherein the composite film comprises a decorative layer on a side facing away from the carrier.

18. The equipment part according to claim 17, wherein the decorative layer is a transparent material comprising an imprint with a pattern.

19. The equipment part according to claim 12, wherein the first and the second paint layer each have refractive indices that are lower than the refractive index of the light-conducting layer.

20. The equipment part according to claim 12, wherein the first and second paint layers are at least partially transparent.

* * * * *